(12) United States Patent
Li et al.

(10) Patent No.: US 12,305,654 B1
(45) Date of Patent: May 20, 2025

(54) FULLY AUTOMATIC DEVICE FOR PUMPING COLD AIR INTO BLOCK-STONE SUBGRADE

(71) Applicant: Northwest Institute of Eco-Environment and Resources, Chinese Academy of Sciences, Gansu (CN)

(72) Inventors: Yasheng Li, Gansu (CN); Zhi Wen, Gansu (CN); Fei Wang, Gansu (CN); Kun Xiang, Gansu (CN)

(73) Assignee: Northwest Institute of Eco-Environment and Resources, Chinese Academy of Sciences, Gansu (CN)

( * ) Notice: Subject to any disclaimer, the term of this patent is extended or adjusted under 35 U.S.C. 154(b) by 0 days.

(21) Appl. No.: 19/019,315

(22) Filed: Jan. 13, 2025

(30) Foreign Application Priority Data

Jun. 14, 2024 (CN) .......................... 202410768829.X (51) Int. Cl.
*F04D 25/04* (2006.01)
*E01C 3/06* (2006.01)
(Continued)

(52) U.S. Cl.
CPC ................ *F04D 25/04* (2013.01); *E01C 3/06* (2013.01); *E01C 11/26* (2013.01); *F03D 9/28* (2016.05);
(Continued)

(58) Field of Classification Search
CPC .......... F04B 25/04; F04B 17/02; E01C 11/26; E01C 3/06; Y02E 10/72; F04D 13/06;
(Continued)

(56) References Cited

U.S. PATENT DOCUMENTS

| | | | | |
|---|---|---|---|---|
| 699,829 A | * | 5/1902 | Albrefczenski | ......... F03D 15/10 417/334 |
| 2,969,920 A | * | 1/1961 | Giannoni | ................ E01C 11/26 62/93 |

(Continued)

FOREIGN PATENT DOCUMENTS

| | | |
|---|---|---|
| CN | 102278284 A | 12/2011 |
| CN | 203076492 U | 7/2013 |

(Continued)

*Primary Examiner* — Peter J Bertheaud
(74) *Attorney, Agent, or Firm* — CKC & Partners Co., LLC (57) ABSTRACT

The present invention discloses a fully automatic device for pumping cold air into block-stone subgrade and includes an outer cylinder, an inner cylinder, a power system and an air pumping system; and utilizes natural wind to drive the air pumping system to operate for the purpose of pumping cold air into a block-stone subgrade, and achieves the effect of pumping cold air into the block-stone subgrade in cold seasons and keeping warm air out of the block-stone subgrade in warm seasons by disposing a temperature-sensitive clutch. The present invention may effectively improve the engineering applicability of the block-stone subgrade construction technology in the areas with heavy snowfall; the present invention effectively improves the performance of the block-stone subgrade as a thermal semiconductor on an inter-annual scale and further protects the permafrost underlying the subgrade.

6 Claims, 8 Drawing Sheets

(51) Int. Cl.
*E01C 11/26* (2006.01)
*F03D 9/28* (2016.01)
*F03D 15/00* (2016.01)
*F04B 17/02* (2006.01)
*F04D 13/06* (2006.01)
*F04D 19/00* (2006.01)
*F04D 25/02* (2006.01)
*F04D 25/08* (2006.01)
*F04D 27/00* (2006.01)
*F04D 29/52* (2006.01)
*F04D 29/54* (2006.01)

(52) U.S. Cl.
CPC .............. *F03D 15/00* (2016.05); *F04B 17/02* (2013.01); *F04D 19/002* (2013.01); *F04D 25/02* (2013.01); *F04D 25/08* (2013.01); *F04D 27/00* (2013.01); *F04D 29/522* (2013.01); *F04D 29/541* (2013.01); *F04D 13/06* (2013.01)

(58) Field of Classification Search
CPC ...... F04D 19/002; F04D 25/08; F04D 29/522; F04D 29/541; F04D 25/02; F03D 9/28; F03D 15/00
See application file for complete search history.

(56) References Cited

U.S. PATENT DOCUMENTS

| | | | | |
|---|---|---|---|---|
| 3,603,507 | A | * | 9/1971 | Devlin .................... E01H 13/00 239/263.1 |
| 3,875,996 | A | * | 4/1975 | Von Kohorn ........... E01C 13/02 165/45 |
| 4,784,570 | A | * | 11/1988 | Bond ........................ F03D 9/12 417/334 |
| 2011/0135444 | A1 | | 6/2011 | Lee |

FOREIGN PATENT DOCUMENTS

| | | |
|---|---|---|
| CN | 105257489 A | 1/2016 |
| CN | 115110369 A | 9/2022 |
| CN | 220890535 U | 5/2024 |
| EP | 0042801 A1 | 12/1981 |

\* cited by examiner

FULLY AUTOMATIC DEVICE FOR PUMPING COLD AIR INTO BLOCK-STONE SUBGRADE

CROSS-REFERENCE TO RELATED APPLICATIONS

This non-provisional application claims priority under 35 U.S.C. § 119 (a) to patent application No. 202410768829.X filed in P.R. China on Jun. 14, 2024, the entire contents of which are hereby incorporated by reference.

Some references, if any, which may include patents, patent applications and various publications, may be cited and discussed in the description of this application. The citation and/or discussion of such references, if any, is provided merely to clarify the description of this application and is not an admission that any such reference is "prior art" to the application described herein. All references listed, cited and/or discussed in this specification are incorporated herein by reference in their entirety and to the same extent as if each reference was individually incorporated by reference.

FIELD OF THE INVENTION

The present invention relates to the technical field of block-stone subgrade construction in permafrost areas, in particular to a fully automatic device for pumping cold air into block-stone subgrade.

BACKGROUND OF THE INVENTION

A major challenge to the subgrade construction in permafrost areas is that the subgrade construction and operation degrade the underlying permafrost, and in turn, the permafrost degradation eventually causes a range of damages to the subgrade. For the purpose of highway and railway construction engineering on the Qinghai-Tibetan Plateau of China, scientific researchers have researched, developed, and widely promoted the application of block-stone subgrade technology. The block-stone subgrade has advantages of simple construction, low construction cost and low probability of post-construction damages. For subgrade construction engineering on the Qinghai-Tibetan Plateau, using block stones as subgrade has significantly maintained the underlying permafrost in a low-temperature frozen state. The technical principle based on which the block-stone subgrade is capable of being used to protect the underlying permafrost in the Qinghai-Tibetan Plateau permafrost areas is as follows: when cold seasons arrive, a subgrade layer on a top of a block-stone layer is cooled off before permafrost at a bottom of the block-stone layer, so the permafrost underlying the subgrade is cooled off quickly and protected; the block-stone subgrade has a high porosity, so a cold wind blowing through the block-stone layer during cold seasons can quickly cool off the permafrost underlying the block-stone layer and the permafrost is protected; in warm seasons, although the solar radiation causes a temperature elevation of the subgrade layer on the top of the block-stone subgrade, the whole block-stone layer has a small thermal conductivity coefficient due to the fact that block stones in the block-stone layer are linked in point contact with each other and low heat is transferred by air convection, which in turn protects the underlying permafrost. With the deepening of China's Belt and Road Initiative and the development of all-round China-Russia cooperation, the construction of highways and railways in the high-latitude permafrost areas of Siberia, Russia is on the agenda. The feasibility study on the application of construction engineering method for Qinghai-Tibet Plateau permafrost areas to the construction engineering in the Siberian region of Russia found that, the conventional block-stone subgrade technology is not suitable for the Siberian region of Russia due to the fact that the snowfall in the Siberian region is much greater than that in the Qinghai-Tibet Plateau and the pores on the block-stone subgrade layer sides are covered by snow throughout cold seasons, which makes it impossible for a cold wind to cool off the permafrost underlying the block-stone subgrade during cold seasons. In order to solve the problem that the block-stone subgrade technology is not suitable for the Siberian region of Russia, an intelligent device for pumping cold air into block-stone subgrade is innovatively provided to promote the application of engineering and technical experiences from China, and improve the discourse power of Chinese construction engineering organizations.

The existing technical ideas to solve the problem of ineffective ventilation cooling through the block-stone subgrade sides covered by snow or sand are shown as follows: (1) additionally providing ventilation pipes, namely, disposing the ventilation pipes in a block-stone layer above the ground to prevent the snow or sand cover from compromising the cooling effect of a block-stone subgrade; the air flowing in the ventilation pipes cools the block-stone subgrade, but the soil body between the ventilation pipes is not accessible for mechanical construction and the construction quality is not guaranteed; and after construction of the block-stone subgrade, under the condition that snowfall or sand deposition increases with climate change, applying the ventilation pipes to the block-stone layer involves high construction cost; and (2) according to the technical solution of CN115110369A, using a method for embedding a U-shaped ventilation pipe in a block-stone subgrade, disposing a peristaltic air pump at an end of the U-shaped pipe, drawing air out of the pipe through the peristaltic pump by a wind force, and in turn, driving air to flow through the U-shaped pipe to cool the block-stone subgrade; and this technical method makes both of cold air in cold seasons and warm air in warm seasons flow through the U-shaped pipe and produce a thermal effect on the block-stone layer, which is not conducive to the cooling performance of the block-stone subgrade.

SUMMARY OF THE INVENTION (1) The Present Invention is Intended to Solve the Following Technical Problem:

To overcome the defect of the method using a ventilation pipe in the prior art, namely, both of cold air in cold seasons and warm air in warm seasons flowing through the U-shaped pipe and producing a thermal effect on the block-stone layer, which is not conducive to the cooling performance of the block-stone subgrade, the present invention provides a fully automatic device for pumping cold air into block-stone subgrade, which automatically pumps cold air into the block-stone subgrade to cool the underlying permafrost under the blowing action of a cold wind in cold seasons, and automatically stops working in warm seasons to avoid forcing warm air in warm seasons into the block-stone subgrade.

(2) The Technical Solution of the Present Invention is as Follows:

A fully automatic device for pumping cold air into block-stone subgrade, including an inner cylinder configured with an air inlet and an air outlet at an upper portion and a lower portion of the inner cylinder respectively, the inner cylinder internally provided with an air pumping system including an air pumping impeller and a drive shaft pivotably connected inside the inner cylinder, a temperature-sensitive clutch and a driven bevel gear orderly arranged at an upper end of the drive shaft, the air pumping impeller disposed between the air inlet and the air outlet and connected to the drive shaft, the temperature-sensitive clutch including a lower plate and an upper plate, the lower plate and the upper plate are connected by means of a slidable structure and sliding in the same direction as an axial direction of the drive shaft, a temperature-sensitive column provided between the lower plate and the upper plate, the upper plate connected to the driven bevel gear through a movable drive shaft, a power system provided on a top of the inner cylinder and including an actuator, a power shaft and a driving bevel gear, the actuator connected to the power shaft for driving the power shaft to rotate, the driving bevel gear securely disposed on the power shaft, and the temperature-sensitive column capable of making the driving bevel gear and the driven bevel gear engage or disengage the transmission.

In a further technical solution, an outer cylinder is pivotably connected to the upper portion of the inner cylinder, an air intake hood is provided on a side of the outer cylinder and located at a position opposite to that of the air inlet, and a guiding plate is provided on another side of the outer cylinder which is opposite to the air intake hood.

In a further technical solution, the actuator is a power fan, a power fan housing is provided on a top of the outer cylinder and connected to the guiding plate by means of an extension rod, the power fan housing is pivotably connected to the power fan at an end away from the guiding plate, the power fan is connected to the power shaft, the power fan housing is internally provided with a power shaft locating plate, and the power shaft is pivotably connected to the power shaft locating plate.

In a further technical solution, the air pumping impeller includes four impellers, from top to bottom, including a first-stage air pumping impeller, a second-stage air pumping impeller, a third-stage air pumping impeller and a fourth-stage air pumping impeller, a first impeller shaft of the first-stage air pumping impeller being connected to the drive shaft by means of a No. 1 ratchet, a second impeller shaft of the second-stage air pumping impeller being connected to the first impeller shaft by means of a No. 2 ratchet, a third impeller shaft of the third-stage air pumping impeller being connected to the second impeller shaft by means of a No. 3 ratchet, a fourth impeller shaft of the fourth-stage air pumping impeller being connected to the third impeller shaft by means of a No. 4 ratchet, an air pumping locating plate individually fixed at the upper and lower portions inside the inner cylinder, the fourth impeller shaft pivotably connected to the air pumping locating plate at the lower portion, and the drive shaft pivotably connected to the air pumping locating plate at the upper portion.

In a further technical solution, the No. 1 ratchet includes a pawl plate and a ratchet plate, the ratchet plate is configured with a connection hole, helical teeth are arranged on a periphery of a wall of the connection hole, the pawl plate is provided with a boss, a groove is configured on a side wall of the boss, a pawl is hinged inside the groove, a return spring is provided between the pawl and the groove, and the pawl engages with the helical teeth.

In a further technical solution, the slidable structure includes two tooth grooves on a top of the lower plate and two teeth at a bottom of the upper plate, the two teeth and the two tooth grooves are in one-to-one correspondence, and the teeth are slidably received in the corresponding tooth grooves, with the tooth grooves open at upper ends thereof.

In a further technical solution, an inner cylinder bearing stand is provided on the top of the inner cylinder, the lower portion of the inner cylinder is a cylinder body, a top of the inner cylinder bearing stand is pivotably connected to the outer cylinder through a tapered roller bearing, a lower portion of the inner cylinder bearing stand is an inner cylinder cap, and two support arms are uniformly arranged at a lower portion of the inner cylinder cap and connected to the cylinder body, 4 rounded square air outlets are configured at a bottom of the cylinder body, and the air inlet is a space formed between the two support arms and flush with the air intake hood.

(3) To Sum Up, after the Above Technical Solution is Used, the Beneficial Effects of the Present Invention are as Follows:

1. The present invention automatically works in different manners between the cold and warm seasons; at a low temperature in cold seasons, a temperature-sensitive clutch enables a driving bevel gear to connect to a driven bevel gear, and a cold wind blowing a power fan produces a torque to drive the rotation of a first-stage air pumping impeller, a second-stage air pumping impeller, a third-stage air pumping impeller and a fourth-stage air pumping impeller in an air pumping system, thus pumping cold air into a block-stone subgrade; and in warm seasons, the temperature-sensitive clutch disengages the driving bevel gear from the driven bevel gear, so as to stop the air pumping system from pumping warm air into the block-stone subgrade.

2. The present invention promises the most effective use of the block-stone subgrade-based subgrade cooling technology in the Siberian region of Russia under the working condition of high snowfall. The present invention pumps cold air into the block-stone subgrade with natural wind energy in cold seasons, increases the cooling intensity of the block-stone subgrade in cold seasons, and is particularly beneficial to the application under the working condition that a side of the block-stone subgrade is covered with snow.

3. In the present invention, the difference in airflow pumped between the cold and warm seasons greatly enhances the engineering application effectiveness of the block-stone subgrade, and further increases the thermal-semiconductor engineering application effectiveness of the block-stone subgrade on an inter-annual scale.

4. The present invention has the advantages of strong durability and low construction cost, and all components in the present invention are in mechanically metal structure, which are more resistant to weathering and have lower construction cost than air pumping mechanisms including a solar panel, an electric motor and the like, and effectively reduce the post-construction maintenance costs.

5. The present invention automatically pumps cold air into the block-stone subgrade to cool the underlying permafrost under the blowing action of a cold wind in cold seasons, and automatically stops working in warm seasons to avoid forcing warm air in warm seasons into the block-stone subgrade. The present invention pumps cold air into the snow-covered block-stone subgrade during cold seasons, thereby cooling the block-stone layer and the underlying permafrost; the overall thermal conductivity coefficient of the block-stone subgrade is small during warm seasons, and the present invention stopping working during warm seasons avoids forcing warm air in warm seasons into the block-stone subgrade. By means of the differentiated working manners of the present invention between cold and warm seasons, the block-stone subgrade meets service conditions in the Siberian region of Russia, thus, it is possible to apply the block-stone subgrades with low construction cost, easy construction, low probability of post-construction damages and good engineering benefits in the Siberian region.

DETAILED DESCRIPTION OF THE EXEMPLARY EMBODIMENT

The present invention will be further described in detail in combination with drawings and embodiments for clear understanding of the purpose, technical solutions and advantages of the present invention.

As shown in FIG. 1 to FIG. 10. A fully automatic device for pumping cold air into block-stone subgrade, which includes an inner cylinder 2 configured with an air inlet 17 and an air outlet 16 at an upper portion and a lower portion of the inner cylinder 2 respectively, the inner cylinder 2 internally provided with an air pumping system 4 including an air pumping impeller and a drive shaft 30 pivotably connected inside the inner cylinder 2, a temperature-sensitive clutch 23 and a driven bevel gear 22 orderly arranged at an upper end of the drive shaft 30, the air pumping impeller disposed between the air inlet 17 and the air outlet 16 and connected to the drive shaft 30, the temperature-sensitive clutch including a lower plate 36 and an upper plate 33, the lower plate 36 and the upper plate 33 are connected by means of a slidable structure and sliding in the same direction as an axial direction of the drive shaft 30, a temperature-sensitive column 34 provided between the lower plate 36 and the upper plate 33, the upper plate 33 connected to the driven bevel gear through a movable drive shaft 31, a power system provided on a top of the inner cylinder 2 and including an actuator, a power shaft 19 and a driving bevel gear 20, the actuator connected to the power shaft 19 for driving the power shaft 19 to rotate, the driving bevel gear 20 securely disposed on the power shaft 19, the temperature-sensitive column 34 capable of making the driving bevel gear 20 and the driven bevel gear 22 engage or disengage the transmission.

The present invention in service mainly includes an outer cylinder 1, the inner cylinder 2, the power system 3 and the air pumping system 4.

Figure 3:
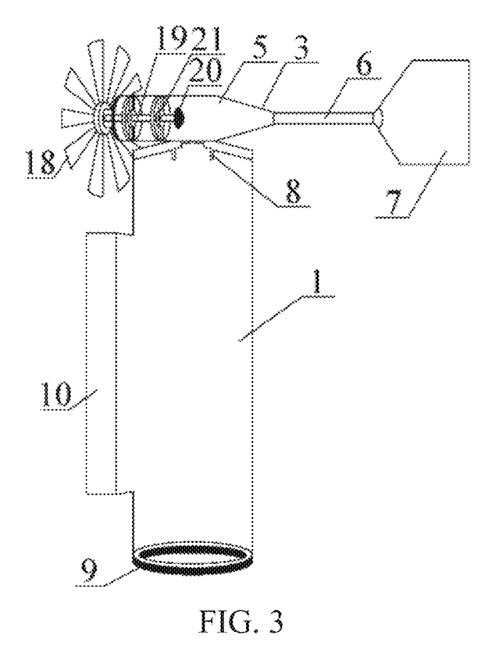
FIG. 3 is an exploded view of various parts of the outer cylinder of the present invention.

On a top of the outer cylinder 1 is a power fan housing 5 internally equipped with the power system 3, an extension rod 6 and a guiding plate 7 are orderly arranged at a tail of the power fan housing 5, the power fan housing 5 and the outer cylinder 1 are connected by means of welding, a bearing support 8 coupled with the inner cylinder 2 is provided on a top of an inner cavity of the outer cylinder 1, a cylindrical roller bearing 9 connected to the inner cylinder 2 is provided at a bottom of the inner cavity, a rectangular air intake hood 10 is provided at a side, and the air intake hood 10 opens in a direction opposite to a guiding direction of the guiding plate 7 on the same axis.

Figure 4:
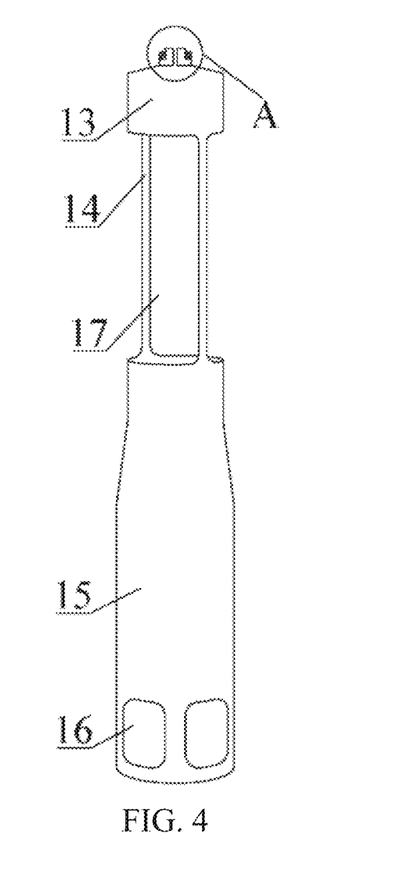
FIG. 4 is an exploded view of various parts of the inner cylinder of the present invention.
Figure 5:
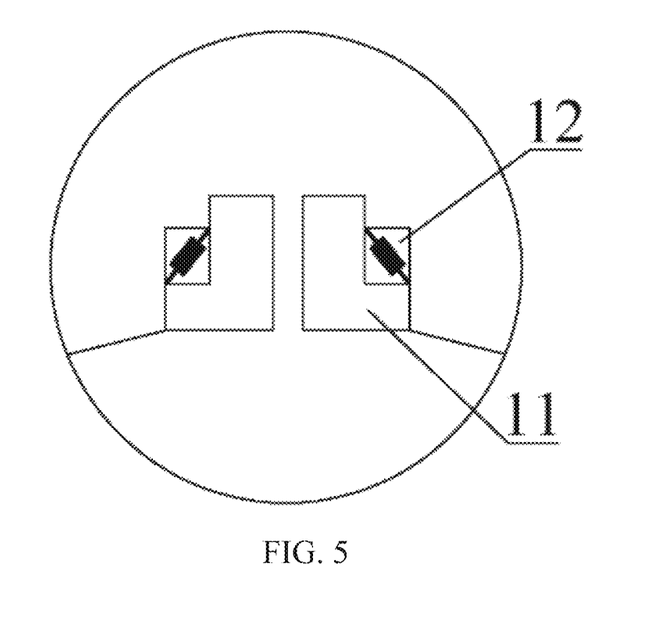
FIG. 5 is an enlarged view of A in FIG. 4.

An inner cylinder bearing stand 11 is provided on the top of the inner cylinder 2, the inner cylinder bearing stand 11 is provided with a tapered roller bearing 12 at a top and eventually connected to the outer cylinder 1, a lower portion of the inner cylinder bearing stand 11 is an inner cylinder cap 13 structure, and two support arms 14 are uniformly arranged at a lower portion of the inner cylinder cap 13 and connected to a cylinder body 15, 4 rounded square air outlets 16 are configured at a bottom of the cylinder body 15; and the air inlet 17 is a space formed between the two support arms 14 and flush with the air intake hood 10.

Figure 6:
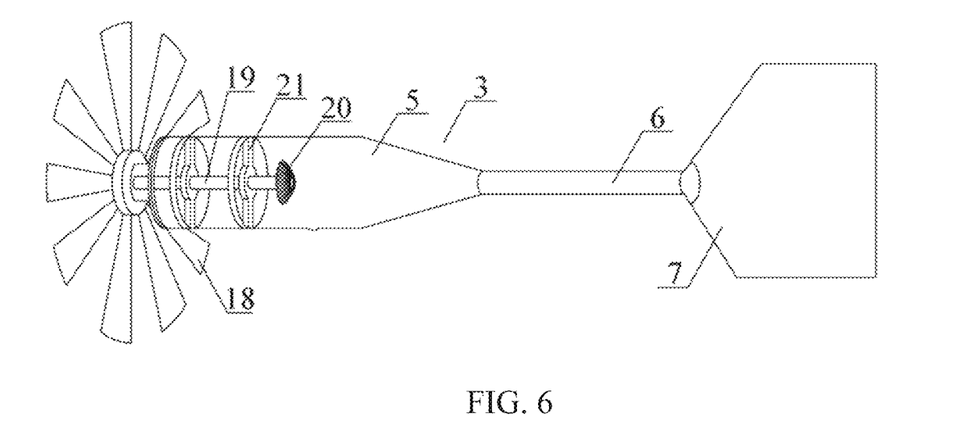
FIG. 6 is an exploded view of various parts of the power system of the present invention.

The power system 3 is located inside the power fan housing 5 and includes a power fan 18, the power shaft 19 and the driving bevel gear 20, and the power system 3 is fixed in the power fan housing 5 through a power shaft locating plate 21. When a cold wind blows through the present invention, the guiding plate 7 at the tail of the power fan housing 5 makes the power fan 18 face the wind head-on for maximum power.

Figure 7:
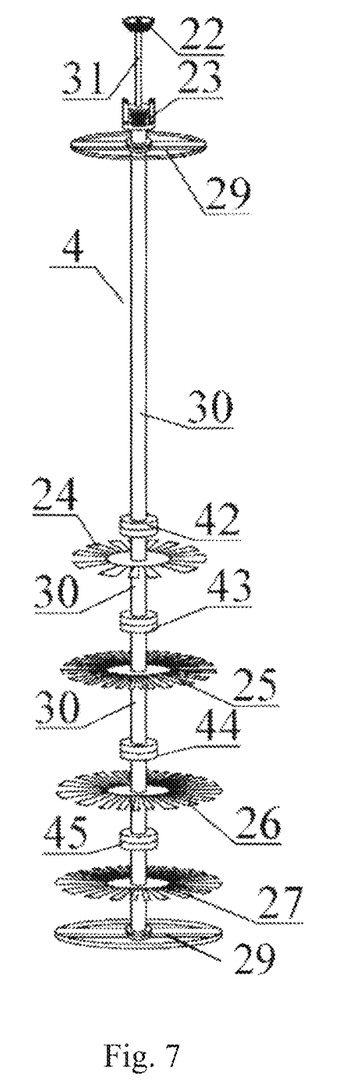
FIG. 7 is an exploded view of various parts of the air pumping system of the present invention.

The air pumping system 4 includes the driven bevel gear 22, the temperature-sensitive clutch 23, a first-stage air pumping impeller 24, a second-stage air pumping impeller 25, a third-stage air pumping impeller 26, a fourth-stage air pumping impeller 27 and four ratchets available for one-way transmission only, and the air pumping system is fixed inside the inner cylinder 2 by means of two sets of air pumping locating plates 29. The No. 1 ratchet 42, the No. 2 ratchet 43, the No. 3 ratchet 44 and the No. 4 ratchet 45 are arranged between the driven bevel gear 22, the first-stage air pumping impeller 24, the second-stage air pumping impeller 25, the third-stage air pumping impeller 26 and the fourth-stage air pumping impeller 27, respectively. The first-stage air pumping impeller 24 is located in a lower position of the air inlet 17, and the fourth-stage air pumping impeller 27 is slightly above the air outlet 16. The No. 1 ratchet 42, the No. 2 ratchet 43, the No. 3 ratchet 44 and the No. 4 ratchet 45 are of the same structure.

Figure 8:
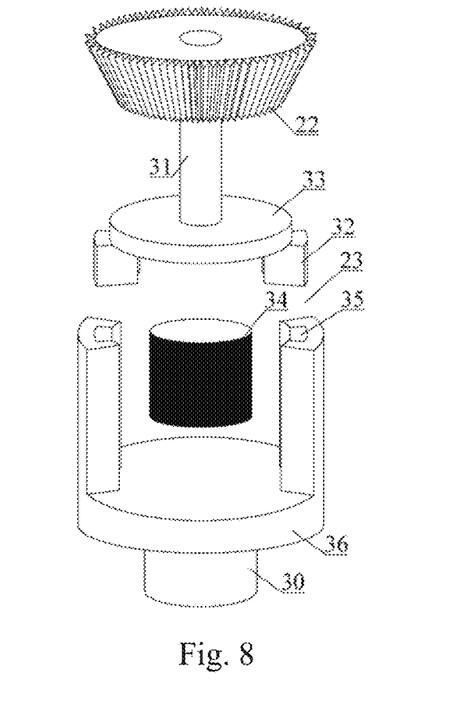
FIG. 8 is an exploded view of the temperature-sensitive clutch of the present invention.

The temperature-sensitive clutch 23, from top to bottom, includes the driven bevel gear 22, the movable drive shaft 31 being a high-strength light drive shaft, an upper plate 33 provided with two teeth 32, a temperature-sensitive column 34 made of a material with a large coefficient of thermal expansion, such as a polyamide-6 or polytetrafluoroethylene material, and a lower plate 36 provided with two tooth grooves 35. The driven bevel gear 22 is located above the driving bevel gear 20; when the temperature rises, the temperature-sensitive column 34 in the temperature-sensitive clutch 23 upwardly pushes the upper plate 33 having the teeth 32 received in the tooth grooves 35, and further pushes the driven bevel gear 22 away from the driving bevel gear 20 below the driven bevel gear 22 through the movable drive shaft 31, and in turn, prevents the air pumping system 4 from pumping warm air into the block-stone subgrade. When the temperature decreases, the temperature-sensitive column 34 retracts, making the driven bevel gear 22 drop down and contact the driving bevel gear 20 below the driven bevel gear 22, and driving the rotation of the first-stage air pumping impeller 24, the second-stage air pumping impeller 25, the third-stage air pumping impeller 26 and the fourth-stage air pumping impeller 27 in the air pumping system 4 to achieve the purpose of pumping the low-temperature air into the block-stone subgrade to cool it off.

Figure 9:
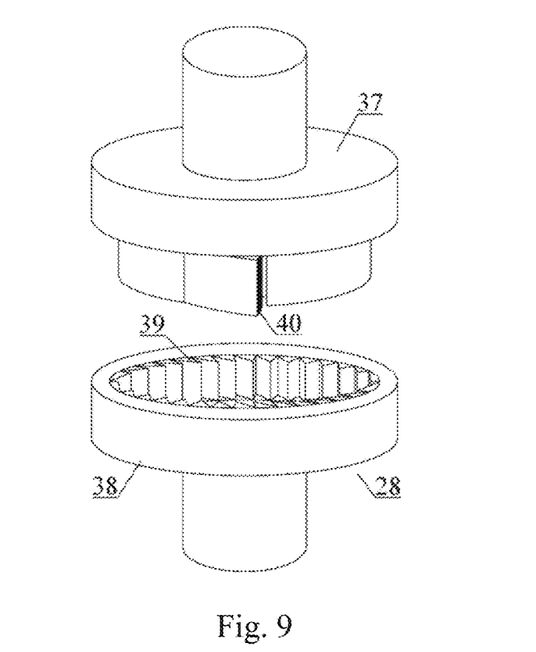
FIG. 9 is an exploded view of the No. 1 ratchet of the present invention.
Figure 10:
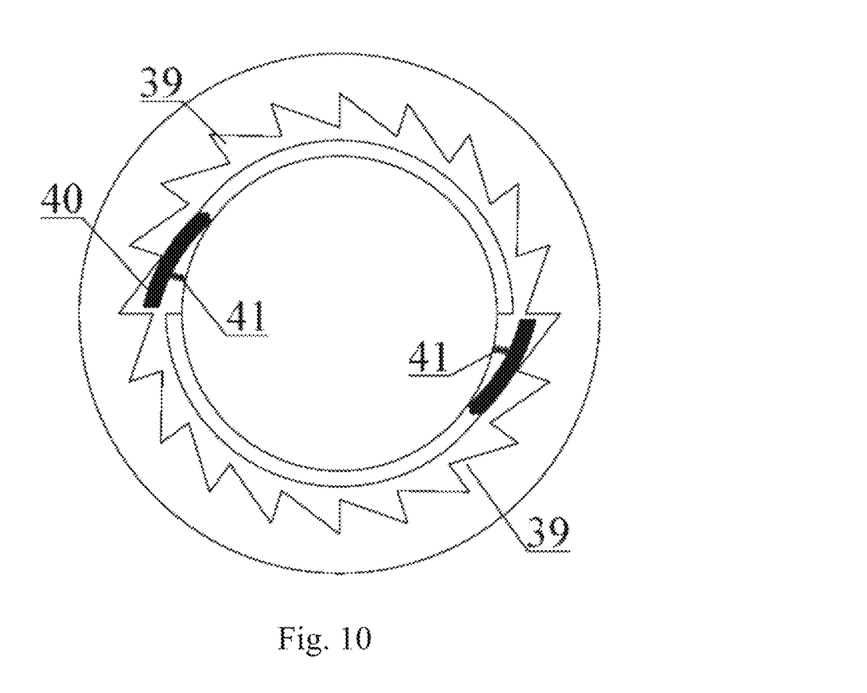
FIG. 10 is a schematic diagram of a connection between the pawl and the helical teeth of the present invention.

The No. 1 ratchet 42 includes a pawl plate 37 and a ratchet plate 38; the ratchet plate 38 is internally provided with an even number of pairs of helical teeth 39, the pawl plate 37 is a protruding round-tower structure with two sets of pawls 40, one end of each of the pawls 40 is hinged inside a groove of the pawl plate 37, and a return spring 41 is provided therebetween. When the pawl plate 37 and the ratchet plate 38 are combined, the pawls 40 engage with the helical teeth 39, when the pawl plate 37 is rotated counterclockwise, it drives the ratchet plate 38 to rotate; and when the pawl plate 37 is rotated clockwise, the pawls 40 and the helical teeth 39 are in a slidable state, and the ratchet plate 38 is not rotated with the pawl plate 37. The No. 1 ratchet 42, the No. 2 ratchet 43, the No. 3 ratchet 44 and the No. 4 ratchet 45 are used to achieve the one-way transmission between the driven bevel gear 22, the first-stage air pumping impeller 24, the second-stage air pumping impeller 25, the third-stage air pumping impeller 26 and the fourth-stage air pumping impeller 27; when the wind is weakened, the first-stage air pumping impeller 24 continues rotating under the action of an inertia force rather than decelerates with a reduced rotation speed of the driving bevel gear 20, and a corresponding next-stage impeller continues rotating under the action of an inertia force rather than decelerates with a reduced rotation speed of a current-stage impeller; and with the arrangement of the No. 1 ratchet 42, the No. 2 ratchet 43, the No. 3 ratchet 44 and the No. 4 ratchet 45, the impellers are rotated by means of the inertia force to the greatest extent, thus reducing a damage caused to a drive shaft 29 under the action of torsion and maximizing the service life of the drive shaft 29.

Working principle: the cold wind in cold seasons blowing through the block-stone subgrade is utilized to drive the power fan of the present invention to rotate, and in turn, drive the multi-stage air pumping impellers of the air pumping system to rotate, thus achieving the purpose of pumping cold air into the block-stone subgrade, so that cold air may enter the snow-covered block-stone subgrade slopes, and ensure that the block-stone subgrade technology is suitable for Siberian region of Russia, where is subject to heavy snowfall during wintertime; in warm seasons, the temperature-sensitive column in the temperature-sensitive clutch expands with an elevated temperature and upwardly pushes the driven bevel gear away from the driving bevel gear, so that the power system driven by the power fan fails to drive the air pumping system to operate, and the present invention is prevented from pumping warm air into the block-stone subgrade in warm seasons; the present invention automatically pumps cold air into the block-stone subgrade in cold seasons and avoids pumping warm air into the block-stone subgrade in warm seasons, maintaining the function of the block-stone subgrade as a thermal semiconductor on an inter-annual scale; and in cold seasons, cold air is kept out of the block-stone subgrade by the snow-covered block-stone subgrade sides, the present invention automatically pumps cold air into the block-stone subgrade to solve the problem, so that the block-stone subgrade technology in combination with the present invention is suitable for areas with heavy snowfall in cold seasons, particularly the Siberian region of Russia.

Figure 1:
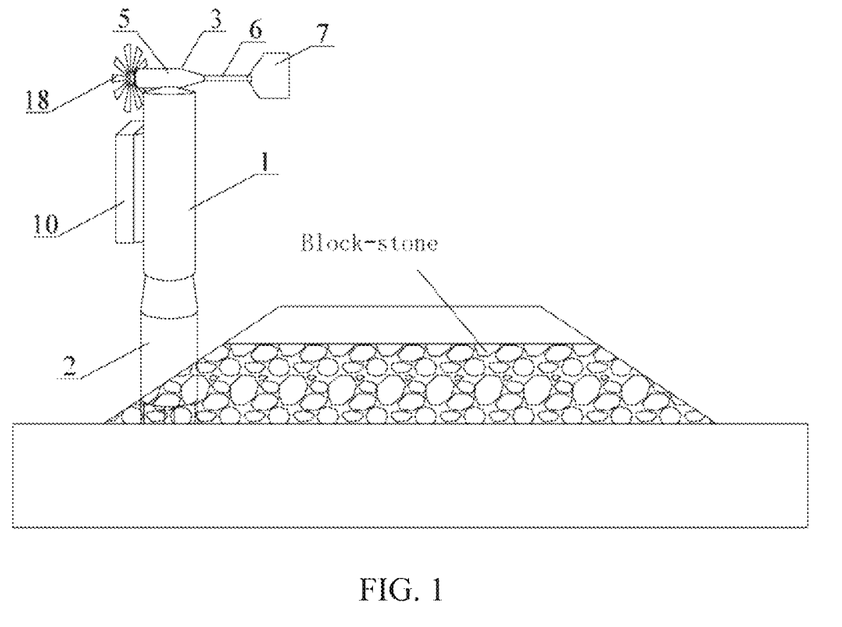
FIG. 1 is a schematic view showing the application of the present invention.

As shown in FIG. 1, the present invention is mainly used in the block-stone subgrade construction technology, wherein an air outlet 17 of the inner cylinder 2 of the present invention is inserted into the block-stone subgrade, and the outer cylinder 1 and the power system 3 on a top thereof are outside a subgrade body.

Figure 2:
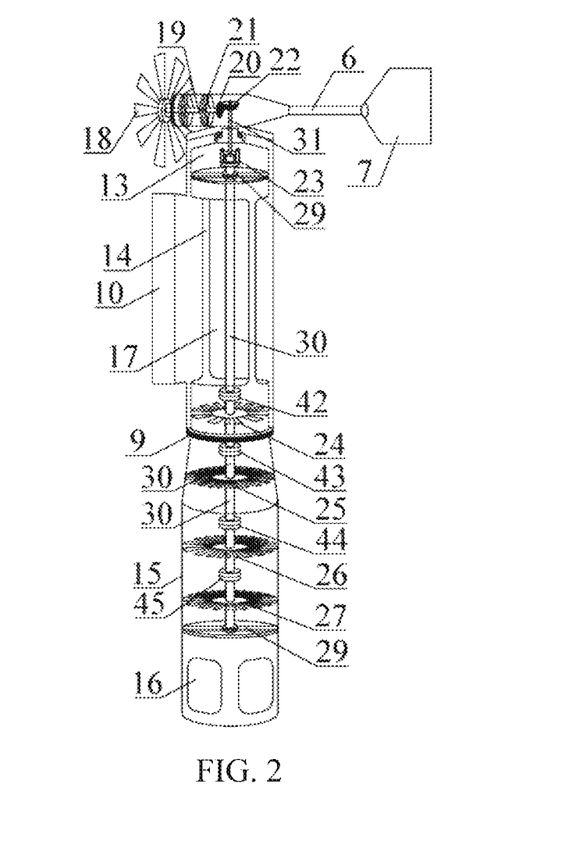
FIG. 2 is an exploded view of main components of the present invention.

As shown in FIGS. 1, 2, 7, during cold seasons, the temperature-sensitive column 34 in the temperature-sensitive clutch 23 retracts at a low temperature, so that the driving bevel gear 20 is in contact with the driven bevel gear 22, the power fan 18 drives the driving bevel gear 20 to rotate by a wind force and eventually drives the driven bevel gear 22 to rotate, under the continuous draught forced by the first-stage air pumping impeller 24, the second-stage air pumping impeller 25, the third-stage air pumping impeller 26 and the fourth-stage air pumping impeller 27 of the air pumping system 4, cold air is effectively forced into the block-stone subgrade to effectively reduce the temperature of permafrost underlying the block-stone subgrade and effectively improve the performance of the block-stone subgrade as the thermal semiconductor on an inter-annual scale; when the snow-covered block-stone subgrade sides keep cold air out, the present invention additionally forces cold air into the block-stone subgrade, so that the block-stone subgrade technology is suitable for use in permafrost areas with heavy winter snowfall, such as Siberian region of Russia.

As shown in FIGS. 2, 3, 4, 5 and 6, the present invention mainly includes the inner cylinder 2 and the outer cylinder 1, the power fan housing 5 provided with the power system 3 is located on a top of the outer cylinder 1, and the air intake hood 10 on the outer cylinder 1 is flush with the air inlet 17 on the inner cylinder 2.

As shown in FIGS. 2, 3, 5 and 6, the guiding plate 7 located at the tail of the power fan housing 5 always keeps the power fan 18 at the optimal windward side. As the power fan housing 5 and the outer cylinder 1 are connected by means of welding, when the guiding plate 7 keeps the power fan 18 at the optimal windward side, the air intake hood 10 on the outer cylinder 1 also in the frontally windward state, creating a good working condition for introducing cold air into the air pumping system 4.

As shown in FIGS. 2, 7 and 9, the air pumping system 4 is located in the inner cylinder 2, and provided in the present embodiment are air pumping impellers at four stages: the first-stage air pumping impeller 24, the second-stage air pumping impeller 25, the third-stage air pumping impeller 26 and the fourth-stage air pumping impeller 27, which are mainly used to force cold air into the block-stone subgrade; and the arrangement of the No. 1 ratchet 42, the No. 2 ratchet 43, the No. 3 ratchet 44 and the No. 4 ratchet 45 enables a next-stage air pumping impeller rotating under the action of the inertia force does not stop due to a sudden stop of a current-stage air pumping impeller, thereby effectively prolonging the service life of the drive shaft 30 and the movable drive shaft 31.

As shown in FIGS. 7 and 8, the temperature-sensitive clutch 23 is located between the driven bevel gear 22 and the first-stage air pumping impeller 24 in the air pumping system 4. When warm seasons arrive, the temperature-sensitive column 34 in the temperature-sensitive clutch 23 elongates with the elevated air temperature, and at the same time, upwardly pushes the driven bevel gear 22 to disengage from the driving bevel gear 20 connected to the power fan 18, so as to prevent the air pumping system 4 from forcing warm air into the block-stone subgrade; when cold seasons arrive, the temperature-sensitive column 34 in the temperature-sensitive clutch 23 is shortened with the reduced air temperature, and the driven bevel gear 22 moves downward with the temperature-sensitive column under the action of gravity and connects with the power fan 18, the power fan 18 rotates under the action of a wind force, so that the air pumping system 4 pumps cold air into the block-stone subgrade; in this way, the present invention enhances the thermal semiconductor effect of the block-stone subgrade on the inter-annual scale through the differentiated working manners between cold and warm seasons.

As shown in FIGS. 7 and 9, the presence of the ratchets in the present invention causes the air pumping impellers to rotate only in one way and prevents the rotation of the next-stage air pumping impeller from affecting the current-stage air pumping impeller, which in turn effectively extends the service life of the air pumping system 4.

The above are only preferred embodiments of the present invention.

What is claimed is:

1. A fully automatic device for pumping cold air into block-stone subgrade, comprising an inner cylinder configured with an air inlet and an air outlet at an upper portion and a lower portion of the inner cylinder respectively, the inner cylinder internally provided with an air pumping system comprising an air pumping impeller and a drive shaft pivotably connected inside the inner cylinder, a temperature-sensitive clutch and a driven bevel gear orderly arranged at an upper end of the drive shaft, the air pumping impeller disposed between the air inlet and the air outlet and connected to the drive shaft, the temperature-sensitive clutch comprising a lower plate and an upper plate, the lower plate and the upper plate are connected by means of a slidable structure and sliding in the same direction as an axial direction of the drive shaft, a temperature-sensitive column provided between the lower plate and the upper plate, the upper plate connected to the driven bevel gear through a movable drive shaft, a power system provided on a top of the inner cylinder and comprising an actuator, a power shaft and a driving bevel gear, the actuator connected to the power shaft for driving the power shaft to rotate, the driving bevel gear securely disposed on the power shaft, the temperature-sensitive column capable of making the driving bevel gear and the driven bevel gear engage or disengage the transmission, the slidable structure comprising two tooth grooves on a top of the lower plate and two teeth at a bottom of the upper plate, the two teeth and the two tooth grooves in one-to-one correspondence, and the teeth slidably received in the corresponding tooth grooves, with the tooth grooves open at upper ends thereof.

2. The fully automatic device for pumping cold air into block-stone subgrade according to claim 1, an outer cylinder is pivotably connected to the upper portion of the inner cylinder, an air intake hood is provided on a side of the outer cylinder and located at a position opposite to that of the air inlet, and a guiding plate is provided on another side of the outer cylinder which is opposite to the air intake hood.

3. The fully automatic device for pumping cold air into block-stone subgrade according to claim 2, the actuator is a power fan, a power fan housing is provided on a top of the outer cylinder and connected to the guiding plate by means of an extension rod, the power fan housing is pivotably connected to the power fan at an end away from the guiding plate, the power fan is connected to the power shaft, the power fan housing is internally provided with a power shaft locating plate, and the power shaft is pivotably connected to the power shaft locating plate.

4. The fully automatic device for pumping cold air into block-stone subgrade according to claim 3, the air pumping impeller comprises four impellers, from top to bottom, comprising a first-stage air pumping impeller, a second-stage air pumping impeller, a third-stage air pumping impeller and a fourth-stage air pumping impeller, a first impeller shaft of the first-stage air pumping impeller being connected to the drive shaft by means of a No. 1 ratchet, a second impeller shaft of the second-stage air pumping impeller being connected to the first impeller shaft by means of a No. 2 ratchet, a third impeller shaft of the third-stage air pumping impeller being connected to the second impeller shaft by means of a No. 3 ratchet, a fourth impeller shaft of the fourth-stage air pumping impeller being connected to the third impeller shaft by means of a No. 4 ratchet, an air pumping locating plate individually fixed at the upper and lower portions inside the inner cylinder, the fourth impeller shaft pivotably connected to the air pumping locating plate at the lower portion, and the drive shaft pivotably connected to the air pumping locating plate at the upper portion.

5. The fully automatic device for pumping cold air into block-stone subgrade according to claim 4, the No. 1 ratchet comprises a pawl plate and a ratchet plate, the ratchet plate is configured with a connection hole, helical teeth are arranged on a periphery of a wall of the connection hole, the pawl plate is provided with a boss, a groove is configured on a side wall of the boss, a pawl is hinged inside the groove, a return spring is provided between the pawl and the groove, and the pawl engages with the helical teeth.

6. The fully automatic device for pumping cold air into block-stone subgrade according to claim 1, an inner cylinder bearing stand is provided on the top of the inner cylinder, the lower portion of the inner cylinder is a cylinder body, a top of the inner cylinder bearing stand is pivotably connected to the outer cylinder through a tapered roller bearing, a lower portion of the inner cylinder bearing stand is an inner cylinder cap, and two support arms are uniformly arranged at a lower portion of the inner cylinder cap and connected to the cylinder body, a rounded square air outlet is configured at a bottom of the cylinder body, and the air inlet is formed between the two support arms and flush with the air intake hood.

* * * * *